UNITED STATES PATENT OFFICE.

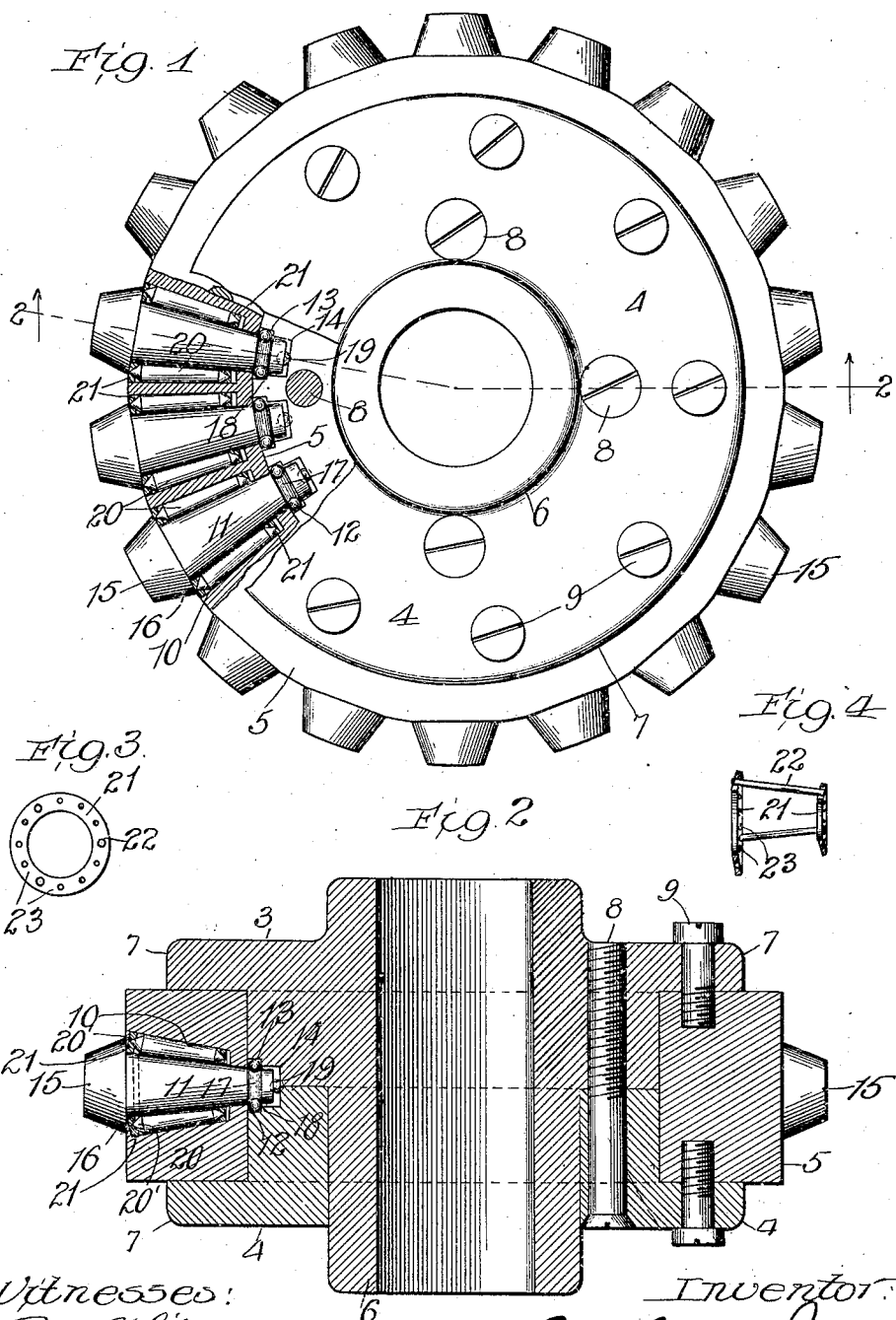

CARL AUGUST JANSON, OF CHICAGO, ILLINOIS.

ROLLER-TOOTH GEAR.

No. 874,342.　　　Specification of Letters Patent.　　　Patented Dec. 17, 1907.

Application filed April 11, 1907. Serial No. 367,614.

*To all whom it may concern:*

Be it known that I, CARL AUGUST JANSON, a subject of the King of Sweden, and a resident of Chicago, county of Cook, and State of Illinois, have invented certain new and useful Improvements in Roller-Tooth Gears, of which the following is a specification.

The main objects of this invention are to provide an improved roller-tooth for gear-wheels and racks which mesh with spiral or worm-gears; and to provide an improved form of journal-bearings and end thrust-bearings for such teeth, reducing the friction to a minimum and admitting of maximum tooth strength. These objects are attained by the construction shown in the accompanying drawings, in which:

Figure 1 is a side elevation, partly broken away, of a wheel constructed according to this invention. Fig. 2 is a section of the same on line 2—2 of Fig. 1. Fig. 3 is a detail of one of the disks of the roller cages. Fig. 4 is a sectional view of the cage.

In the construction shown, the body of the wheel comprises two flanged members 3 and 4, laid face to face, and an annular rim or tooth-ring 5, embracing a part of the periphery of each member 3, 4. One of the members, 3, is provided with the hub 6, the other member 4 being fitted over the hub. Desirably said members are provided with flanges 7, that partly inclose the sides of the tooth-ring. The members 3 and 4 are secured together by screws 8. Through the flanges 7 pass screws 9 that enter the tooth-ring 5 and prevent rotation thereof relative to the wheel members 3, 4.

The tooth-ring 5 is provided with an annular series of radially disposed tooth-sockets 10, which are tapered from without inwardly, and at their inner ends are abruptly reduced in diameter so as almost to touch the tooth-shank 11 where the latter passes therethrough. The inner surface of the ring 5 around each socket is milled flat, to provide a suitable annular bearing surface for the retaining-balls 12.

Just radially inward from the inner end of the tooth-socket 10, the wheel members 3, 4 are provided with a recess which comprises a ball-race 13 and an inner part 14, of reduced size. In the bottom of the recess 14 is a slight depression.

Each of the roller-teeth comprises a head or tooth proper 15, and an inwardly extending shank 11 integral therewith. The head is frusto-conical in form and provides an outstanding shoulder 16 which serves to hold in place the roller-cage, hereinafter described. The tooth itself is held against outward movement by means of retaining-balls 12 which lie partly within an annular groove 17 cut in the shank 11 in register with the ball-race 13. These balls are held in place by the shoulder formed by the inner face of the tooth-ring surrounding the shank 11, and are held against inward movement by the inner face 18 of the ball-race 13. The inner end of the shank 11 is provided with a slight central concavity, between which and that of the recess 14 a thrust-ball 19 is placed. All inward pressure upon the tooth will be received by this pivotal thrust-ball, and thereby diverted from the rollers and retaining-balls 12.

The tooth-shank is journaled on a series of antifriction rollers 20, which are held in proper alinement and spacing by a cage consisting of two rings 21, rigidly connected by rods 22. Preferably the ends of the rollers 20 are pointed, as shown at 20', and the recesses 23 in the rings 21 to receive these pointed ends are correspondingly shaped. The rings 21 are dished, as shown, in order to present a perpendicular face to the end of each of the rollers 20. The cage and rollers are rotatable and are held against outward movement by the projecting shoulder 16 of the tooth.

The wheel is assembled by placing its member 3 in an inverted position from that shown in Fig. 2, with the tooth-ring 5 in position thereon, inserting the sets of rollers 20 into the tooth-sockets, then inserting the teeth and the thrust-balls 19, then dropping in the retaining-balls 12, then slipping the ring 4 over the hub 6 into contact with member 3 and ring 5, and lastly placing the fastening-screws 8 and 9, whereby the wheel is solidly united and the tooth-ring is prevented from turning relatively of the members 3, 4.

What I claim as my invention and desire to secure by Letters Patent, is:

1. A gear comprising a body having a series of tooth-sockets therein, teeth journaled in said sockets and each comprising an inwardly converging tapered shank seated in the socket and an integral head extending out of such socket, an anti-friction bearing for said shank near its head, and an end-bearing axially located at the inner end of said shank for resisting an inward thrust thereon.

2. A gear comprising an annular rim having therein a series of radially disposed tooth-sockets, rotatable teeth seated in said sockets, each of said teeth comprising an inwardly converging tapered shank and a head extending outward of the periphery of the body, and a series of tapered rollers interposed between each of said shanks and the surrounding walls of its respective socket.

3. A gear comprising an annular rim having therein a series of radially disposed tooth-sockets, rotatable teeth seated in said sockets, each of said teeth comprising an inwardly converging tapered shank and a head extending outward of the periphery of the body, a series of tapered rollers interposed between each of said shanks and the surrounding walls of its respective socket, said body having a bearing surface opposed to the inner end of each of said shanks, and a rotatable bearing interposed between each of such bearing surfaces and its respective shank.

4. A gear comprising a body having a tooth-socket therein, a tooth comprising a shank seated in said socket and a head extending outwardly therefrom, an anti-friction roller bearing adapted to resist lateral pressure on said shank, said body having a bearing surface opposed to the inner end of said shank, and a rotatable bearing axially interposed between said bearing surface and the adjacent end of said shank.

5. A gear comprising a body having in its periphery a tooth-socket closed at its inner end, a tooth comprising a shank seated in said socket and a head extending outward of the periphery of said body, a series of rollers surrounding said shank and fitting between said shank and the walls of said socket, and an axially located thrust-ball interposed between the inner end of said shank and the body of the tooth-socket.

6. A gear comprising a body having a tooth-socket in its periphery, a tooth comprising an inwardly converging tapered shank seated in said body and a head extending outwardly therefrom, and an axially positioned thrust-ball engaging the inner end of said shank.

7. A gear comprising a body having a tooth-socket in its periphery, a tooth comprising an inwardly converging tapered shank seated in said body and a head extending outwardly therefrom, said shank being concave at its inner end, said body having thereon a concave bearing surface axially opposed to said inner end of the shank, and an axially located thrust-ball interposed between said shank and concave bearing.

8. A roller-tooth gear having in its periphery a tooth-socket provided near the inner end thereof with an enlargement forming a shoulder; a roller-tooth shank mounted in said socket and having an annular groove in register with said enlargement of the tooth socket; a series of retaining-balls within said groove and having contact with said shoulder; a series of rollers disposed around the tooth-shank within said socket, and an end bearing for said shank.

9. A gear comprising an annular rim having therein a series of radially disposed tooth-sockets, axially rotatable teeth seated in said sockets, each of said teeth comprising an inwardly converging tapered shank and a head extending outward of the periphery of the body, a series of tapered rollers interposed between each of said shanks and the surrounding walls of its respective socket, said rollers having conical ends, retaining rings having seats for said conical ends and rigidly connected to keep said rollers spaced apart.

10. A roller-tooth gear comprising two members secured together face to face, a tooth-ring seated upon said members and held against relative rotation, said tooth-ring having a tooth-socket therein, said socket extending radially through said ring and being enlarged to form a ball-race at the inner face of said tooth-ring, a roller-tooth shank mounted in said socket and having an annular groove in register with said ball-race, and a series of retaining-balls within said groove and ball-race.

11. A roller-tooth gear comprising two members secured together face to face, a tooth-ring seated upon said members and held against relative rotation, said tooth-ring having a tooth-socket therein, said socket extending radially through said ring and being enlarged to form a ball-race at the inner face of said tooth-ring, a roller-tooth shank mounted in said socket and having an annular groove in register with said ball-race, a series of retaining-balls within said groove and ball-race, a series of rollers disposed around said shank within said socket, and a retaining-cage for said rollers.

12. A roller-tooth gear comprising two members secured together face to face, a tooth-ring seated upon said members and held against relative rotation, said tooth-ring having a tooth-socket therein, said socket extending radially through said ring and being enlarged to form a ball-race at the inner face of said tooth-ring, a roller-tooth shank mounted in said socket and having an annular groove in register with said ball-race, a series of retaining-balls within said groove and ball-race, and an axially located thrust-ball rotatably supported at the inner end of said tooth-shank.

13. In a roller-tooth gear, the combination of a body having therein a tooth-socket, a roller-tooth shank mounted therein, a series of conical-ended rollers around said shank within said socket, and a retaining cage having end bearings for said rollers.

14. In a roller-tooth gear, the combination of a body having therein a tooth-socket, a roller-tooth shank mounted therein, a series of conical-ended rollers around said shank within said socket, and a retaining cage comprising a pair of connected rings provided with conical bearing-sockets for the ends of said rollers.

15. In a roller-tooth gear, the combination of a body having therein a tooth-socket closed at the bottom, a roller-tooth having an inwardly extending shank mounted in said socket, rollers disposed within said socket around the tooth-shank, and a pivotal thrust-ball between the inner end of said shank and the bottom of said socket.

16. A roller-tooth wheel comprising two members each having an outer flange and secured together, a tooth-ring seated upon said members between said flanges and having therein a tooth-socket, said members having therein a recess forming the inner end part of the tooth-socket, said recess being enlarged adjacent to the inner face of the tooth-ring to provide a ball-race; a roller-tooth shank mounted in said socket, said shank having therein a ball-groove in register with said ball-race; a series of retaining-balls within said groove and ball-race and having contact with the inner face of the tooth-ring; and a series of rollers disposed around the tooth-shank within said socket.

17. A roller-tooth wheel comprising two members secured together, a tooth-ring seated upon said members and held against rotation thereon, said tooth-ring having therein an inwardly tapering tooth-socket which is substantially reduced at its inner end so as to provide a shoulder for a set of retaining-balls; said lateral members being provided with a recess forming a continuation of the tooth-socket and comprising a ball-race, the outer face of which is formed by the inner face of the tooth-ring; a roller tooth having a shank disposed within said socket, said shank having a ball-groove therein in register with said ball-race, retaining-balls within said groove and race, a pivotal thrust-ball between the inner end of the shank and the bottom of its socket, and a plurality of rollers around the tooth-shank within the larger part of the tooth-socket.

18. In a roller-tooth gear, the combination of a body having therein a tooth-socket, a roller-tooth shank mounted therein, a series of rollers around said shank within said socket, a retaining cage having end bearings for said rollers, means loosely securing said shank within its recess, and said shank having a shoulder adapted to retain said retaining cage in the socket.

Signed at Chicago this 8th day of April 1907.

CARL AUGUST JANSON.

Witnesses:
   ANDREW LARSON,
   E. A. RUMMLER.